United States Patent
Schleuss (10) Patent No.: US 12,318,734 B2
(45) Date of Patent: Jun. 3, 2025

(54) MECHANICALLY STABLE ULTRAFILTRATION MEMBRANE, AND METHOD FOR PRODUCING SAME

(71) Applicant: Sartorius Stedim Biotech GmbH, Göttingen (DE)

(72) Inventor: Tobias Schleuss, Göttingen (DE)

(73) Assignee: Sartorius Stedim Biotech GmbH, Göttingen (DE)

( * ) Notice: Subject to any disclaimer, the term of this patent is extended or adjusted under 35 U.S.C. 154(b) by 565 days.

(21) Appl. No.: 17/627,002

(22) PCT Filed: Jul. 29, 2020

(86) PCT No.: PCT/EP2020/071417
§ 371 (c)(1),
(2) Date: Jan. 13, 2022

(87) PCT Pub. No.: WO2021/018971
PCT Pub. Date: Feb. 4, 2021

(65) Prior Publication Data
US 2022/0410081 A1    Dec. 29, 2022

(30) Foreign Application Priority Data
Jul. 30, 2019   (DE) .................... 10 2019 005 373.7

(51) Int. Cl.
*B01D 61/14*    (2006.01)
*B01D 67/00*    (2006.01)
(Continued)

(52) U.S. Cl.
CPC ....... *B01D 67/0013* (2013.01); *B01D 61/145* (2013.01); *B01D 67/0006* (2013.01); *B01D 67/0011* (2013.01); *B01D 67/00165* (2022.08); *B01D 69/02* (2013.01); *B01D 69/1216* (2022.08); *B01D 69/125* (2013.01); *B01D 71/16* (2013.01); *B01D 71/18* (2013.01); *B01D 71/22* (2013.01); *B01D 2323/06* (2013.01); *B01D 2323/12* (2013.01); *B01D 2323/30* (2013.01);
(Continued)

(58) Field of Classification Search
CPC .............. B01D 61/145; B01D 67/0013; B01D 67/0016; B01D 2323/06; B01D 2325/54
See application file for complete search history.

(56) References Cited

U.S. PATENT DOCUMENTS

| | | |
|---|---|---|
| 2003/0038081 A1 | 2/2003 | Wang et al. |
| 2004/0154978 A1 | 8/2004 | Sale et al. |

(Continued)

FOREIGN PATENT DOCUMENTS

| | | |
|---|---|---|
| CN | 104248915 A | 12/2014 |
| DE | 19752527 | 5/1999 |

(Continued)

OTHER PUBLICATIONS

Yang, Li et al—CN 104248915 A machine translation—Dec. 31, 2014 (Year: 2014).*

(Continued)

*Primary Examiner* — Bradley R Spies
(74) *Attorney, Agent, or Firm* — Klarquist Sparkman, LLP (57) ABSTRACT

The invention relates to a mechanically stable ultrafiltration membrane and to a method for producing such an ultrafiltration membrane.

20 Claims, 6 Drawing Sheets

50 %                33 %                25 %

(51) Int. Cl.
  *B01D 69/02* (2006.01)
  *B01D 69/12* (2006.01)
  *B01D 71/16* (2006.01)
  *B01D 71/18* (2006.01)
  *B01D 71/22* (2006.01)

(52) U.S. Cl.
  CPC .... *B01D 2323/42* (2013.01); *B01D 2325/022* (2013.01); *B01D 2325/026* (2013.01); *B01D 2325/0283* (2022.08); *B01D 2325/04* (2013.01); *B01D 2325/24* (2013.01); *B01D 2325/54* (2022.08)

(56) References Cited

U.S. PATENT DOCUMENTS

| | | | |
|---|---|---|---|
| 2013/0056420 | A1 | 3/2013 | Wang et al. |
| 2013/0224379 | A1 | 8/2013 | Kitamura et al. |
| 2014/0284267 | A1 | 9/2014 | Jung et al. |

FOREIGN PATENT DOCUMENTS

| | | |
|---|---|---|
| EP | 2623187 | 8/2013 |
| JP | 2002-537988 A | 11/2002 |
| JP | 2012-110889 A | 6/2012 |
| WO | WO00/53294 | 9/2000 |
| WO | WO 00/053294 A1 | 9/2000 |
| WO | WO2003/015902 | 2/2003 |
| WO | WO2013/050133 | 4/2013 |
| WO | WO2015/029884 | 3/2015 |

OTHER PUBLICATIONS

Liu, Tian-Yin, et al. "Fabrication of a novel dual-layer (PES/PVDF) hollow fiber ultrafiltration membrane for wastewater treatment." Journal of membrane science 472 (2014): 119-132. (Year: 2014).*

Official Communication, dated Feb. 15, 2024, issued in EP Application No. 20 749 860.1, plus translation, 16 pages.

Zhu et al., "Fabrication of Ultrafiltration Membranes with Enhanced Antifouling Capability and Stable Mechanical Properties via the Strategies of Blending and Crosslinking," *Journal of Membrane Science*, vol. 539, May 25, 2017, pp. 116-127.

International Search Report and Written Opinion for International Application No. PCT/EP2020/071417 (dated Sep. 22, 2020).

International Preliminary Report on Patentability for International Application No. PCT/EP2020/071417 (dated Feb. 10, 2022).

Office Action (translation), dated Feb. 28, 2023, issued in Japan Application No. 2022-505632, 8 pages.

Office Action, dated Jan. 11, 2024, issued in related China Application No. 202080055414.8, and machine-based English-language translation, 18 pages.

* cited by examiner

MECHANICALLY STABLE ULTRAFILTRATION MEMBRANE, AND METHOD FOR PRODUCING SAME

CROSS REFERENCE TO RELATED APPLICATIONS

This is the U.S. National Stage of International Application No. PCT/EP2020/071417, filed Jul. 29, 2020, which in turn claims the benefit of German Application No. 10 2019 005 373.7, filed Jul. 30, 2019, which applications are incorporated in their entireties.

The present invention relates to a mechanically stable ultrafiltration membrane and to a method for producing it.

Filtration membranes are classified on the basis of their retentive properties and pore sizes. On the basis of the pore size, for instance, distinctions are generally made between microfiltration membranes (mean pore size: 0.1 to 10 µm), ultrafiltration membranes (mean pore size: 0.01 to less than 0.1 µm), nanofiltration membranes (mean pore size: 0.001 to less than 0.01 µm), and reverse-osmosis membranes (mean pore size: 0.0001 to less than 0.001 µm) (see Shang-Tian Yang, Bioprocessing for Value-Added Products from Renewable Resources, 2007).

In terms of the retentive properties of the membranes, a similar definition may be made on the basis of the molecular weight cut-off (MWCO). The MWCO relates to the dissolved compound (generally dextrans) having the lowest molecular weight, in daltons, for which a fraction of 90% of the dissolved compound is retained by the membrane, or alternatively to the molecular weight of the molecule, in daltons, for which a fraction of 90% of the molecules having this molecular weight is retained by the membrane. For example, a membrane having an MWCO of 10 kDa retains dextrans of 10 kDa and larger to an extent of at least 90%.

In the course of their regular use, ultrafiltration membranes may frequently be subject to impacts, resulting, for example, from pulsation by pumps or other plant components in cross-flow processes, for example. However, many ultrafiltration membranes exhibit low impact resistance orthogonally to the filter face and therefore have a short lifetime and lack adequate stability for certain demanding applications.

It is therefore an object of the present invention to provide an ultrafiltration membrane which has a high impact resistance orthogonally to the filter face, and also a production method for such an ultrafiltration membrane.

This object is achieved by the embodiment characterized in the claims.

The present invention concerns more particularly a method for producing an ultrafiltration membrane, comprising the steps of:
(a) applying a first polymer solution to a support layer, to form a first polymer layer on and/or partially or completely in the support layer,
(b) contacting the coated support layer from step (a) with a gas which comprises a nonsolvent, relative to the polymer in the first polymer solution,
(c) applying a second polymer solution to the first polymer layer, to form a second polymer layer on the first polymer layer, and
(d) introducing the multiply coated support layer into a precipitating bath which comprises a precipitant, relative to the polymer in the first and/or second polymer solution.

From the method of the invention an ultrafiltration membrane is obtainable that has a high impact resistance orthogonally to the filter face. This distinguishes it from known ultrafiltration membranes, such as ultrafiltration membranes produced by conventional double coating, for instance. In the method of the invention, a first polymer layer (preliminary coating) is exposed to a nonsolvent-containing gas, producing a damping region in the first polymer layer. Only then, with a time offset, is a second polymer layer (main coating) applied. The interim contacting with a nonsolvent-containing gas in step (b) gives the ultrafiltration membrane the damping region and results in a membrane of enhanced impact resistance.

In the present invention the term "ultrafiltration membrane" refers to a membrane having an MVCO of 1 kDa to 1000 kDa.

In accordance with the invention, in steps (a) and (c) a first and, respectively, a second polymer solution are applied to a support layer and to the coated support layer, respectively, to form a first polymer layer on and/or partially or completely in the support layer and, respectively, a second polymer layer on the first polymer layer.

The polymer solutions used for producing the ultrafiltration membrane are not subject to any special restrictions. Use may therefore be made of any solutions of one or more polymers suitable for membrane formation.

The polymers in solution in the polymer solutions (the membrane-forming polymers) are preferably cellulose derivates selected from the group consisting of cellulose ester, cellulose nitrate and regenerated cellulose. The polymer solutions may independently of one another comprise one or more, preferably one, of these membrane-forming polymers. Examples of cellulose esters are cellulose acetate, such as cellulose monoacetate, cellulose diacetate and cellulose triacetate, cellulose propionate, cellulose butyrate and cellulose acetobutyrate.

The solvents used for the polymer solutions are subject to any special restrictions, provided they are capable of dissolving the polymer or polymers in question. The solvents for the membrane-forming polymer in question (or for each of the membrane-forming polymers) preferably have a solubility under standard conditions (25° C., 1013 hPa) of (in each case) at least 2 wt %, more particularly at least 5 wt %, more preferably at least 10 wt %, more preferably at least 20 wt %, very preferably at least 30 wt %. Suitable solvents are known to the skilled person. Suitable solvents for cellulose acetate, for example, are ketones (e.g. acetone), dioxane, amides (e.g. dimethylacetamide (DMAc), N,N-dimethylpropanamide, 2-hydroxy-N,N-dimethylpropanamide) and N-butylpyrrolidone, and mixtures thereof. Suitable solvents for cellulose nitrate, for example, are acetone and ethyl acetate.

The polymer solutions may further comprise, independently of one another, one or more auxiliaries. Suitable auxiliaries are, for example, swelling agents, solubilizers, hydrophilizing agents, pore formers (porogens) and/or nonsolvents for the polymer in question. Auxiliaries of these kinds are known to the skilled person and are adapted to the membrane-forming polymer. For example, polyethylene glycol (PEG), especially PEG 1000 or PEG 2000, glycerol or polyvinylpyrrolidone (PVP) may be used as swelling agents or pore formers. The polymer solutions independently of one another consist preferably of the corresponding membrane-forming polymer, the solvent and optionally one or more auxiliaries, preferably pore formers, swelling agents and/or a nonsolvent.

The term "nonsolvent" in this context refers to a liquid which is unable to dissolve the membrane-forming polymer. The nonsolvent for the membrane-forming polymer (or each of the membrane-forming polymers) preferably has a solubility under standard conditions of (in each case) at most 1 wt %, very preferably at most 0.1 wt %.

If the polymer solution comprises a nonsolvent (or another precipitant) for the corresponding membrane-forming polymer, the maximum concentration of the nonsolvent (or precipitant) is a concentration not sufficient to lead to precipitation of the membrane-forming polymer. The polymer solutions independently of one another consist preferably of the solvent for the corresponding membrane-forming polymer, the corresponding membrane-forming polymer, and a nonsolvent (mixture).

Suitable nonsolvents are, for example, water, glycerol, isopropanol, ethanol and mixtures thereof. Suitable nonsolvents for cellulose acetate for example, are water, glycerol, isopropanol, ethanol (with descending nonsolvency properties), and mixtures thereof. Suitable nonsolvents for cellulose nitrate, for example, are water and alcohols. Unless otherwise specified, the above definitions and observations relating to nonsolvents are valid analogously for all aspects of the present invention.

The solids content in the polymer solutions is not subject to any special restrictions, and may be chosen on the basis, for example, of the desired type of filter. The term "solids content" in this context refers to the amount of the pure membrane-forming polymer that is present. In one preferred embodiment the polymer solutions independently of one another have the same or different solids contents of 2 to 40 wt %, more particularly of 5 to 30 wt %, more preferably still from 7 to 20 wt %, very preferably from 10 to 16 wt %.

The polymer solutions may have different solids contents, which may be chosen on the basis, for example, of the desired membrane properties. In one preferred embodiment the first polymer solution has a higher solids content than the second polymer solution. For example, the first polymer solution may have a solids content of 10 to 30 wt % and the second polymer solution a solids content of 5 to 20 wt %, with the first polymer solution having a higher solids content than the second polymer solution.

The viscosities of the polymer solutions are not subject to any special restrictions. For example, the polymer solutions independently of one another may have viscosities of 800 to 40000 mPa*s, more particularly of 1000 to 25000 mPa*s, very preferably of 3000 to 15000 mPa*s.

The polymer solutions do not have to be subjected to any defined thermal pretreatments—i.e., it is not necessary to utilize a thermal pretreatment for membrane/structure formation. More particularly the polymer solutions preferably do not have any lower or upper critical solution temperatures.

Methods of applying the polymer solutions are known to the skilled person from the prior art and can be used without special limitations in the method of the invention (e.g., in step (a) and in step (c)). Such methods are, for example, methods in which the (coated) support layer is conveyed, for example, past a doctor blade system or a slot die, from which the corresponding polymer solution emerges. Step (a) takes place preferably using a slot die. Step (c) takes place preferably using a slot die.

In accordance with the invention in step (a) a first polymer solution (2) is applied to a support layer (1), to form a first polymer layer on and/or partially or completely in the support layer (1). This produces a (singly) coated support layer (as shown illustratively in FIG. 1). In step (c) in accordance with the invention a second polymer solution (4) is applied to the first polymer layer, to form a second polymer layer on the first polymer layer (as shown illustratively in FIG. 1). This produces a multiply coated support layer.

In step (a) the first polymer solution may penetrate partially or completely into the support layer. For example, the first polymer layer may penetrate into the support layer to an extent of at least 25%, more particularly at least 50%, very preferably at least 75%.

The support layer may be transported by means of a carrier, which is not subject to any special limitation. Any carrier suitable for membrane production methods from the prior art may be used. The carrier preferably has a planar surface and is inert with respect to the substances used (e.g., polymer solutions and their constituents). Serving preferably as carrier is a moving belt (conveyor belt) or a drum (as shown illustratively in FIG. 1), whereby a continuous implementation of the method can be enabled.

In one preferred embodiment the support layer in step (a) and the coated support layer in step (c) move at a speed of 30 to 500 m/h, more particularly of 60 to 400 m/h, very preferably of 100 to 300 m/h, relative to the respective polymer solution during application thereof. In other words, the (coated) support layer is conveyed at the above-stated speeds, for example, past a doctor blade system or a slot die for application of the respective polymer solution.

The application temperatures in steps (a) and (c) are not subject to any special restrictions. For example, the application temperatures independently of one another may be from 4° C. to 40° C.

Figure 1:
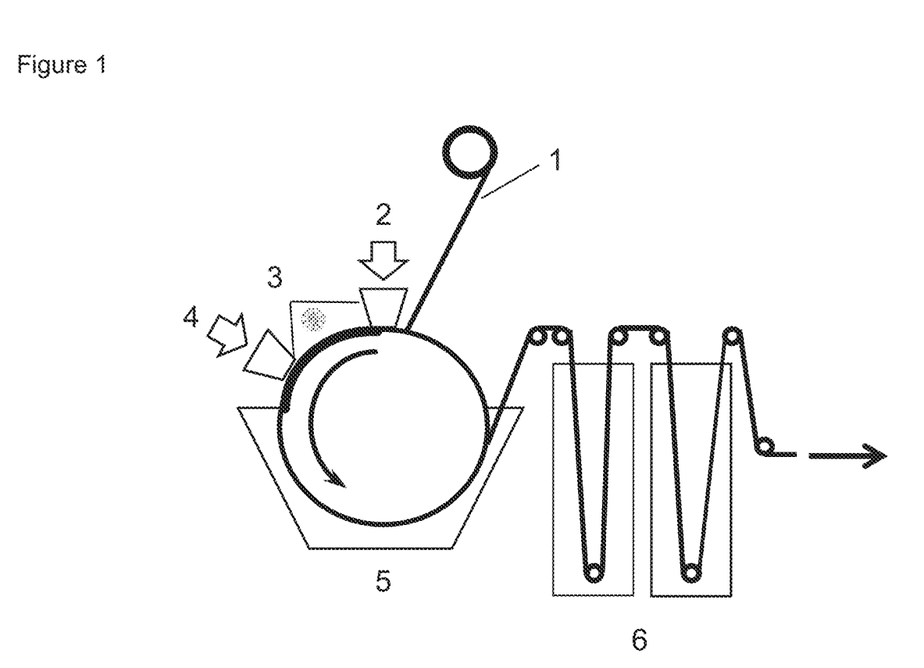
FIG. 1: Illustrative apparatus for implementing the method of the invention

In accordance with the invention in step (b) the coated support layer from step (a) is contacted with a gas (3) which comprises a nonsolvent, relative to the polymer in the first polymer solution (2), (as shown illustratively in FIG. 1). The definitions and observations above in relation to nonsolvents are valid analogously for the nonsolvent which is present in the gas, unless otherwise specified. Step (b) takes place preferably under defined conditions.

The contacting of the nonsolvent-containing gas preferably results in phase separation in the first polymer solution (2). The term "phase separation" in this context refers to a phase separation which produces a preliminary structuring in the cast film (applied polymer solution), meaning that it limits the movement of the polymer chains.

The adhesion of the second polymer layer to the first polymer layer may be reduced as result of any phase separation in the first polymer layer. The adhesion may be promoted, however, through the interaction of the solvent of the second polymer layer with the phase-separated layer; that is, through appropriate choice of the solvent when applying the second polymer solution, a thin, phase-separated layer (of the first polymer layer) may be partially redissolved on application of the second polymer solution, ensuring effective adhesion.

The nonsolvent content of the gas here is not subject to any special restrictions. For example, the gas may comprise from 1.0 to 20 g/m$^3$, more particularly from 1.7 to 18 g/m$^3$, more preferably still from 3.0 to 16 g/m$^3$, very preferably from 5.0 to 15 g/m$^3$, of nonsolvent (absolute amounts of nonsolvent), preferably at a temperature of 20° C. The gas may also comprise from 1.0 to 20 g/m$^3$, more particularly from 1.7 to 19 g/m$^3$, more preferably still from 5.0 to 18 g/m$^3$, more preferably still from 12 to 17 g/m$^3$, very preferably from 15 to 17 g/m$^3$, of nonsolvent (absolute amounts of nonsolvent), preferably at a temperature of 20° C. Where present, the remaining constituents of the gas (or gas mixture) are preferably inert with respect to the substances or apparatus used. The remaining constituents of the gas (or gas mixture) may be, for example, nitrogen, air, or other gases, preferably nitrogen. The gas used which comprises a nonsolvent relative to the polymer in the first polymer solution, is preferably not just (ambient) air. The gas (or gas mixture) preferably contains no oxygen. The gas which comprises a nonsolvent, relative to the polymer in the first polymer solution, may consist of or comprise, for example, nitrogen as carrier gas and a nonsolvent (mixture) consisting of 50 to 100 vol % of water and 0 to 50 vol % of ethanol, preferably 80 to 100 vol % of water and 0 to 20 vol % of ethanol, very preferably 90 to 100 vol % of water and 0 to 10 vol % of ethanol, based on the total amount of nonsolvent.

The means which can be used for contacting a coated support layer with a nonsolvent-containing gas are not subject to any special limitations. For example, the coated support layer may be guided through a chamber (by means of a carrier, for example) which possesses an appropriate gas atmosphere and in which preferably defined conditions are generated. The chamber contains the nonsolvent-laden atmosphere, which is replaced so as to maintain the composition but there are preferably no defined flows arising. This may be achieved, for example, by means of a slight overpressure, which can be dissipated to the surrounding environment via small gaps, for example. Where a closed chamber is used, it is controlled in such a way that the medium is replaced in such a way that the gas moves through the chamber at speeds of less than 0.2 m/s and there are no eddies produced on the surface of the polymer layer.

Contacting may also be accomplished by the supply of an appropriate gas stream, in a channel, for example, in which preferably defined conditions are generated. Typical gas supply technologies may be used here. The volume flow of gas may be, for example, 10 to 600 $m^3/h$ at velocities of 0.3 to 8 m/s (v(gas)), preferably 150 to 300 $m^3/h$ at 2.5 to 5 m/s.

Step (b) is carried out preferably with the aid of a channel. A channel can be used to bring about intentional flow of gas over the polymer layer, with the gas being discharged from the chamber again after it has flowed over. The channel is preferably chosen such that a defined (preferably laminar) flow of the nonsolvent-containing gas impinges on the coated support layer at an angle of between 0 and 45°, preferably between 0 and 35°, very preferably between 0 and 15°. The flow over the layer may take place in the process direction or counter to the process direction. The velocity of the gas in the channel is chosen such that the effective overflow velocity is 0.3 to 8 m/s, preferably 2.5 to 5 m/s.

The exposure time in step (b) is not subject to any special restrictions. The exposure time may be, for example, from 500 ms to 20 s, more particularly from 1.0 s to 10 s, very preferably from 2.0 to 5.0 s. When the aforesaid contact times are employed, the desired properties of the ultrafiltration membrane are able to develop in a particularly advantageous way. In the event of too long a contact time, a solid layer might already be developed, and so precipitation properties might be altered or a (permeable) membrane might not be formed.

In one preferred embodiment the exposure temperature in step (b) is at least 10° C. below the boiling point of the lowest-boiling constituent (generally the solvent) of the first polymer solution. In accordance with the invention this boiling point of the lowest-boiling polymer solution constituent is above 50° C.; in other words, this polymer solution constituent is in liquid form at 50° C. An appropriate exposure temperature is situated, for example, in a range from 10 to 40° C.

The depth of (diffusive) penetration of the nonsolvent, from the atmosphere formed by the nonsolvent-containing gas, in step (b), into the applied first polymer solution, is preferably less than 80%, based on the total depth of the applied first polymer solution. The depth of penetration is preferably at most 50%, more preferably still at most 33%, most preferably still at most 25%. The depth of penetration is preferably at least 5.0%, more preferably still at least 10%, most preferably at least 15%.

In accordance with the invention in step (d) the multiply coated support layer is introduced into a precipitation bath (5) (as shown illustratively in FIG. 1), with the precipitation bath (5) comprising a precipitant, relative to the polymer in the first (2) and/or second (4), preferably the second (4), polymer solution. The precipitant used in step (d) is not subject to any special limitation. In accordance with the invention the same precipitants may be used as in conventional production methods for polymer membranes. The precipitant results in precipitation (phase inversion) of the membrane-forming polymer in the first and/or second polymer layer. The precipitant may be a single compound or a mixture of two or more compounds. In the precipitation bath the precipitant is preferably present in a liquid; with particular preference, in the precipitation bath, the precipitant is itself a liquid or the precipitation bath consists of the precipitant. The precipitant is preferably a nonsolvent for the membrane-forming polymer or for each of the membrane-forming polymers of both polymer solutions, with the precipitation bath preferably consisting of a precipitant selected from the group consisting of water, alcohols and additized water; with particular preference the precipitation bath consists of water as the precipitant.

The temperature of the precipitation bath is not subject to any special restrictions. For example, the temperature of the precipitation bath may be from 1° C. to 60° C., more particularly from 3 to 30° C., very preferably from 4 to 20° C.

The method of the invention may further comprise a step of (c1) contacting the multiply coated support layer from step (c) with a gas which comprises a nonsolvent, relative to the polymer in the second polymer solution, between step (c) and step (d).

The above-stated definitions and observations relating to the nonsolvent, relative to the polymer in the first polymer solution, are valid analogously for the nonsolvent relative to the polymer in the second polymer solution.

The method of the invention may comprise, furthermore, a step of (e) introducing the multiply coated support layer into one or more rinsing tanks (6) after step (d) (as shown illustratively in FIG. 1). The rinsing tanks used in step (e) are not subject to any special restrictions. In accordance with the invention it is possible to use the same rinsing tanks as in conventional production methods for polymer membranes. Rinsing processes are known to the skilled person and may be chosen in line with the requirements for the membrane (in respect, for example, of residual contaminants, extractables and leachables (extractable and leachable substances, respectively)). Appropriate rinsing tanks may comprise, for example, water, mono- or polyhydric alcohols, or other hydrophilic liquids.

As described above, one or more of the polymer solutions may comprise cellulose esters. In order to obtain the corresponding hydrolysis products, the method of the invention may further comprise a step of (f) hydrolyzing the cellulose esters.

The hydrolysis methods used in step (f) are not subject to any special restrictions. In accordance with the invention it is possible to use the same hydrolysis methods as in conventional production methods for polymer membranes—for example, by introducing the multiply coated support layer into an alkali tank. Examples of common methods for hydrolysis are described for example in U.S. Pat. No. 7,422,686-B2. Appropriate alkaline tanks may comprise, for example, 50% KOH in water or in alcohols or in mixtures thereof. The exposure time may be, for example, from 1.0 to 30 min.

The method of the invention may further comprise the step of (g) crosslinking the polymer chains in the polymer layers.

The crosslinking methods used in step (g) are not subject to any special restrictions. In accordance with the invention it is possible to use the same crosslinking methods as in conventional production methods for polymer membranes. Appropriate crosslinking methods are, for example, crosslinking of regenerated cellulose by the method as described for example in U.S. Pat. No. 7,422,686-B2.

The method of the invention may be used for producing an ultrafiltration membrane having more than two polymer layers. For this purpose, step (c) may be performed repeatedly before step (d), in which case different or identical polymer solutions may be used. The precipitation bath in step (d), accordingly, may also comprise a precipitant, relative to the polymers of the further polymer solutions. There may optionally be a further step (b) in each case between the multiple steps (c), independently of one another, in which case the corresponding gas comprises a nonsolvent, relative to the polymer of the polymer solution applied immediately before. The number of steps (c) is correspondingly the same as or greater than the number of steps (b).

A further aspect of the present invention concerns an ultrafiltration membrane obtained by the method of the invention for producing an ultrafiltration membrane. The above definitions and embodiments are valid analogously for this aspect of the present invention. The following definitions and embodiments are likewise valid analogously for the method of the invention for producing an ultrafiltration membrane. The ultrafiltration membrane of the invention is preferably a flat membrane.

As observed above, the interim contacting with a nonsolvent-containing gas in step (b) of the method of the invention gives the ultrafiltration membrane a damping region and results in its having enhanced impact resistance. The impact resistance of an ultrafiltration membrane may be checked with reference to the occurrence of a convective pressure rise. The rate of the number of impacts by a test element which are withstood by such an ultrafiltration membrane without occurrence of a convective pressure rise, the higher the impact resistance of this membrane. The occurrence of a convective pressure rise is therefore an indicator of destabilization of the ultrafiltration membrane in question.

Figure 2:
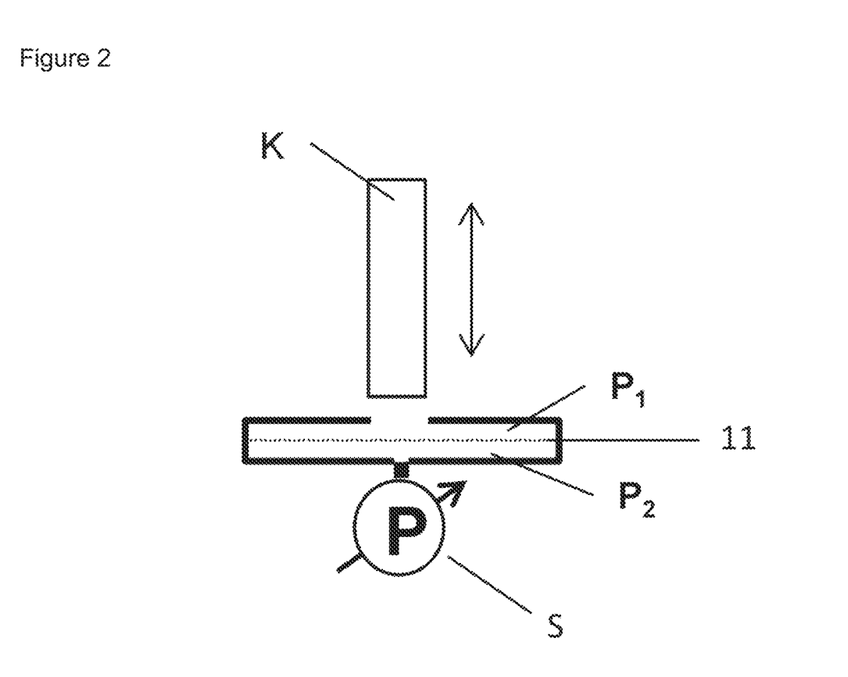
FIG. 2: Illustrative apparatus for implementing the method for investigating the impact resistance of the membrane (11)

This convective pressure rise may be determined by the test method below (as shown illustratively in FIG. 2). This test sees a water-wetted ultrafiltration membrane (11) under test being introduced into a housing and sealed off above and below. A cylindrical test element (K) having a diameter of 20 mm lands repeatedly with a force of at least 1 N, but not more than 250 N, preferably with a force of 80 to 120 N, very preferably with a force of 85 N, on the membrane (11) and, as it does so, it generates impacts on the membrane (11). Above the membrane (11) (on the skin side) the pressure is $P_1$, and below the membrane (11) the pressure is $P_2$, with $P_1 > P_2$ (for example, $P_1 = 3$ bar and $P_2 = 1$ bar). A sensor (S) detects the pressure rise ($\Delta P_2$) below the membrane (11). This pressure rise occurs as a result of diffusion, provided the membrane (11) is intact. If the membrane (11) ruptures as a result of exposure to the test element (K), there is a convective component, further to the diffusive component, and this convective component is detected by a sensor (S). Accordingly, for the pressure rise, further to a diffusive component, a convective component is detected by the sensor (S) as soon as the membrane (11) is damaged by an impact of the test element (K). The impact count at which this convective component has been detected by the sensor (S) is used as a measure of the impact resistance of the membrane (11) under investigation.

In one preferred embodiment of the ultrafiltration membrane of the invention, a convective pressure rise as determined by the test method above occurs at an impact count of above 600, more preferably of above 700, more preferably still of above 800, most preferably of above of above 900.

The ultrafiltration membrane of the invention preferably has two or more, more preferably two, polymer layers disposed on one another on the support layer, with the first polymer layer, which is disposed directly on and/or partially or completely in the support layer having a damping region on the side bordering the second polymer layer, which is disposed on the first polymer layer. The damping region is part of the first polymer layer and is obtained by the interim contacting with a nonsolvent-containing gas in step (b) of the method of the invention. In comparison to the rest of the region of the first polymer layer, the damping region has an altered, preferably more ductile, pore structure.

The support layer of the ultrafiltration membrane is not subject to any special restrictions. It is possible, therefore, to use all support layers known to the skilled person from the prior art. For example, the support layer may be a nonwoven web, a woven fabric or an open microfilter membrane. Examples of nonwoven webs are polyolefin nonwovens, such as, for example, PP/PE core-shell nonwovens, and polyester nonwovens. Microfilter membranes may be made, for example, of polypropylene, polyethylene, polyamide, polyethersulfone or regenerated cellulose. The support layer is preferably a polyolefin nonwoven or a polyolefin membrane.

The thickness of the support layer may be, for example, from 30 to 300 µm, more particularly from 50 to 250 µm, very preferably from 80 to 200 µm.

In one preferred embodiment of the ultrafiltration membrane of the invention the polymer layers have a sponge structure and the outermost polymer layer (i.e., the second polymer layer in the case of a double-layer membrane) has an outer, retentive skin (or skin layer) (on the sponge structure disposed below it). This sponge structure may be continuous or may be interrupted by a visible boundary layer. The term "sponge structure" in this context denotes a structure wherein the membrane matrix consists of a fine, open-pore network of polymer material in each layer of which there are pores of similar size—that is, for example, not fingers or macrovoid (macroporous) structures. The outer, retentive skin layer preferably has a thickness of 0.01 to 2.0 µm, more preferably still of 0.05 to 1.0 µm, very preferably of 0.1 to 0.50 µm. The mean pore size of the outer, retentive skin layer is preferably from 0.5 to 200 nm, more preferably still from 1.0 to 150 nm, very preferably from 2.0 to 100 nm.

The first polymer layer preferably has a microporous sponge structure with a mean pore size of 0.05 to 30 µm, more preferably still of 0.1 to 10 µm, very preferably of 1.0 to 5.0 µm. Additionally, the sponge structure of the first polymer layer penetrates preferably at least 25%, more preferably still at least 50%, very preferably at least 75% into the support layer.

The thickness of the first polymer layer is preferably 10 to 100 µm, more preferably still from 20 to 80 µm, very preferably from 30 to 60 µm. The first polymer layer penetrates preferably 5 µm (given minimum 25% penetration and a minimum first polymer layer thickness of 20 µm) to 100 µm into the support layer. The thickness of the combination of the first polymer layer and support layer is preferably from 50 to 350 µm, more preferably still from 80 to 250 µm, very preferably from 100 to 200 µm.

The thickness of the damping region of the first polymer layer is not subject to any special limitation. For example, the damping region of the first polymer layer may account for up to 20% of the thickness of the first polymer layer. More particularly the damping region of the first polymer layer may have a thickness of 0.1 to 20 µm, more preferably still of 0.5 to 10 µm, very preferably of 1.0 to 5.0 µm. The thickness of the damping region of the first polymer layer may be varied, for example, by varying the nonsolvent content of the gas or the exposure time in step (b) of the method of the invention.

The thickness of the second polymer layer is preferably 20 to 100 µm, more preferably still from 30 to 80 µm, very preferably from 35 to 70 µm. The thickness of the second polymer layer here is preferably less than or equal to the thickness of the combination of first polymer layer and support layer. The mean pore size of the second polymer layer (beneath the outer, retentive skin layer) is preferably from 0.1 to 20 µm, more preferably still from 0.2 to 10 µm, very preferably from 0.5 to 5.0 µm.

The total thickness of the ultrafiltration membrane is not subject to any special limitations. For example, the ultrafiltration membrane has a total thickness of 50 to 400 µm, more particularly of 80 to 350 µm, very preferably of 120 to 300 µm.

Figure 6:
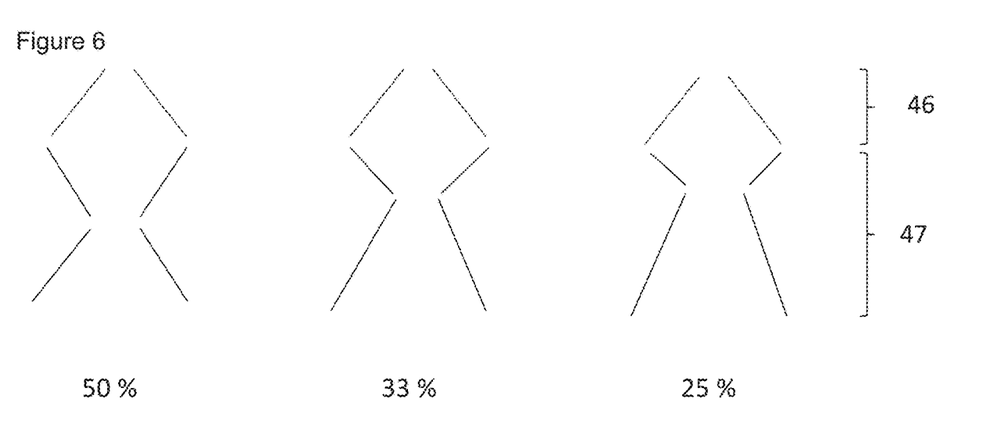
FIG. 6: Illustrative structure of the membrane of the invention for different depths of diffusive penetration (50%, 33%, 25%) of the nonsolvent-containing gas in step (b)

The polymer layers may independently of one another have an asymmetric (widening of the pores in the course of the layer) or a symmetrical sponge structure. In one preferred embodiment the first polymer layer has an asymmetric sponge structure, which more preferably still resembles an hourglass (sand timer) (cf. FIG. 6). The second polymer layer preferably has an asymmetric sponge structure. Most preferably the polymer layers, preferably the first and second polymer layers, taken together, have a complex structure (cf. FIG. 6) in which the pores initially widen, starting from the first main surface, through the membrane toward the nonwoven side, i.e., within the second polymer layer (asymmetric sponge structure), the pores in the interior of the membrane then taper, preferably above the nonwoven layer (entry into the first polymer layer), and the pores in the course of the structure widen again toward the second main surface, preferably within the nonwoven.

As defined above, the membrane-forming polymers are preferably cellulose derivates selected from the group consisting of cellulose ester, cellulose nitrate, and regenerated cellulose, which may be subjected to optional hydrolysis and/or crosslinking methods (optional steps (f) and (g) of the method of the invention). Accordingly, in one preferred embodiment of the ultrafiltration membrane of the invention, the polymer layers comprise cellulose derivates selected from the group consisting of cellulose ester, cellulose nitrate, regenerated cellulose and crosslinked regenerated cellulose. The polymer layers may independently of one another comprise one or more, preferably one, of these polymers. Very preferably the polymer layers comprise cellulose esters, more particularly cellulose acetate, or crosslinked regenerated cellulose, and most preferably they consist thereof.

The ultrafiltration membrane of the invention may have more than two polymer layers, as observed above. In that case the outermost polymer layer has the outer, retentive skin layer. The embodiments and definitions of the second polymer layer can be applied analogously to the further polymer layers. The lower (non-outer) polymer layers may independently of one another each have a damping region.

The filtration capacity of the ultrafiltration membrane is not subject to any special restrictions. For example, the filtration capacity can be adjusted as and when required by means of the pore size of the outer, retentive skin layer. The filtration capacity of the outer filtration membrane may be designed, for example, such that the ultrafiltration membrane retains bovine serum albumin to an extent of not more than 50%.

There is no particular limitation on the possible use of the membrane of the invention. It may be used for filtration, more particularly for the filtration of viruses, proteins or macromolecules.

The present invention is elucidated in more detail by means of the following, nonlimiting examples.

DETERMINATION OF THE (MEAN) PORE SIZES

To determine the (mean) pore sizes of the membrane, a method was employed that is based on membrane cross sections analyzed by scanning electron microscopy (SEM) (described in P. Poelt et. al., *Journal of Membrane Science* 2012, vol. 399-400, pp. 86-94).

Example 1: Production of an Ultrafiltration Membrane with Damping Region and Enhanced Impact Resistance A first polymer solution consisting of 75 wt % of dimethylacetamide (DMAc), 15 wt % of cellulose acetate (Acetati, type Aceplast PC/FG) and 5 wt % of PEG 1000, 5 wt % of water is applied via slot die to a PP/PE core-shell nonwoven (OMB-60; Mitsubishi) moving at 100 m/h orthogonally to the outlet opening. The polymer film then passes through a chamber 10 cm in length, containing an atmosphere with 35% relative humidity (rh) at a temperature of 20° C. On departure from the chamber, the polymer film is moved orthogonally to the outlet opening of a second application medium (carriage with doctor blade), and second polymer solution consisting of 78 wt % of DMAc, 11 wt % of cellulose diacetate (Acetati, type Aceplast PC/FG), 4 wt % of PEG 2000, 4 wt % of glycerol and 3 wt % of water is applied, and is then transferred for phase separation into a water precipitation bath at a temperature of 6° C. The rest of the process, described above, takes place at room temperature.

Figure 3:
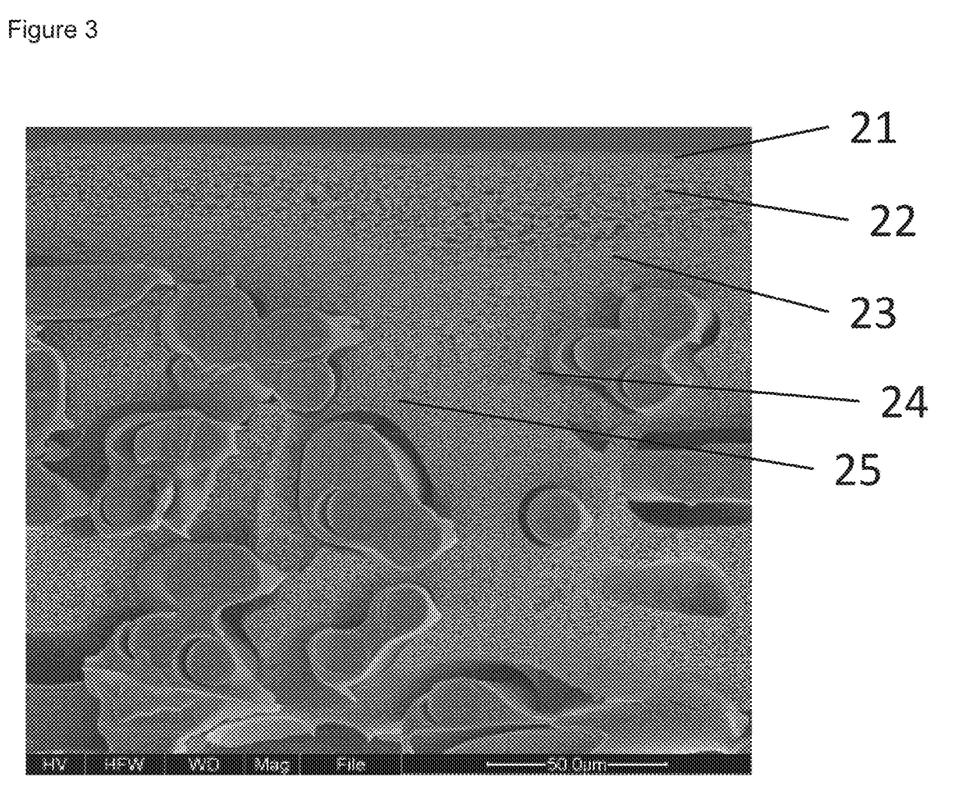
FIG. 3: SEM image of the membrane from Example 1
Figure 4:
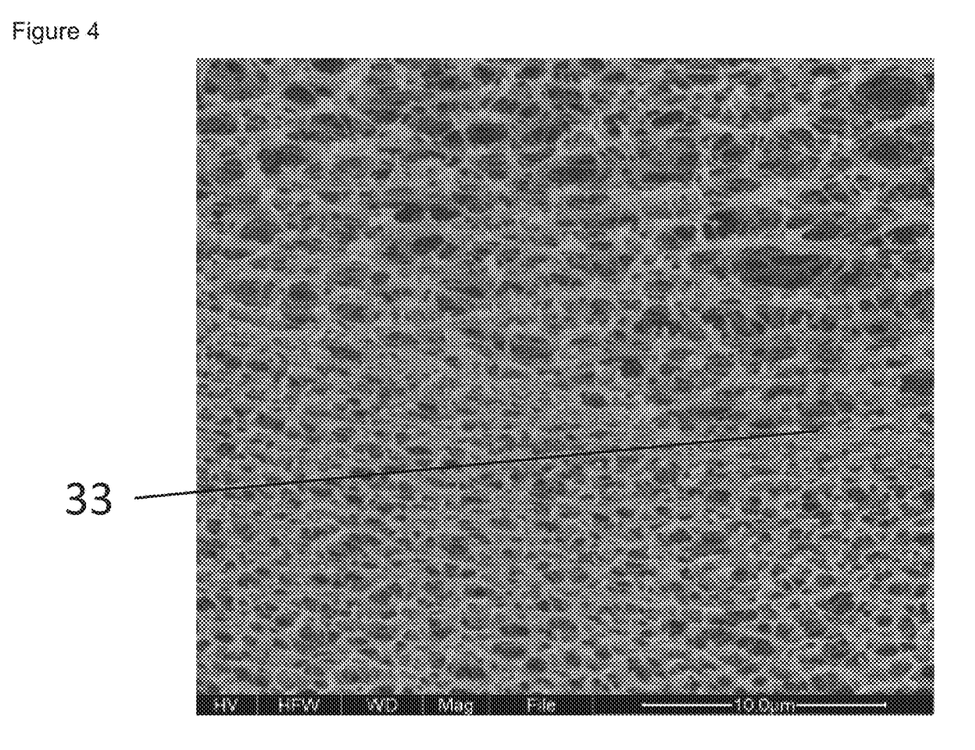
FIG. 4: Enlargement of the SEM image from FIG. 3 to show the damping region (23, 33) and the sponge structures (22, 24) located above/below said region in the second and first polymer layers

The membrane obtained is then passed through a number of rinsing tanks into a tank with 50% KOH, in which the acetyl groups are hydrolyzed. Relative to comparable single-layer or multilayer membranes, the regenerated cellulose membrane has a particular stability in the z-direction. By crosslinking, in accordance for example with the methods described in DE 102004053787 A1, the membrane can be converted into a crosslinked regenerated cellulose membrane (cellulose hydrate membrane) which likewise has the special mechanical stability. SEM images of the membrane obtained are shown in FIGS. 3 and 4.

Figure 5:
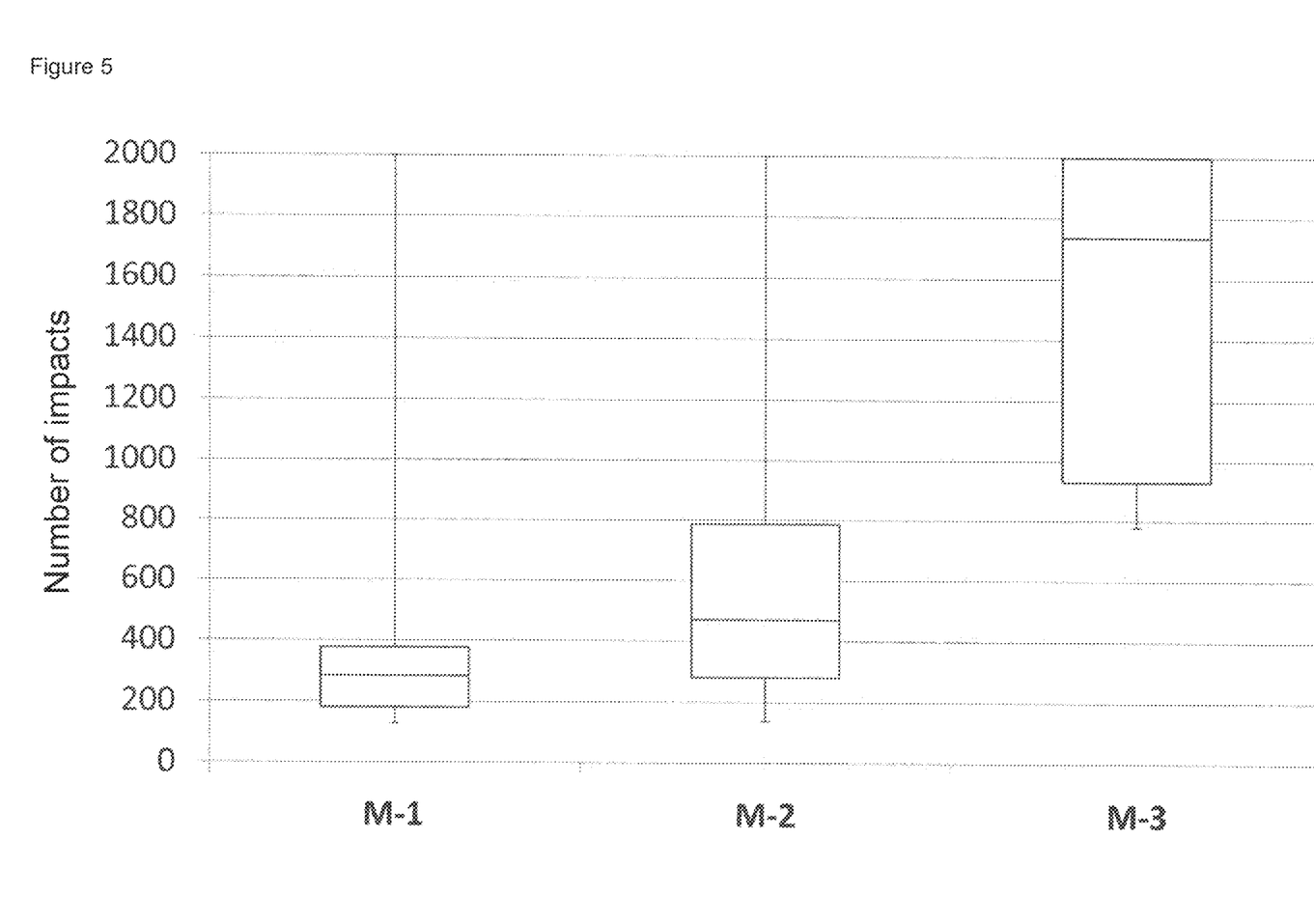
FIG. 5: Results of the method for investigating the impact resistance of different ultrafiltration membranes (M-1 to M-3)

Example 2: Investigation of the Impact Resistance of Different Ultrafiltration Membranes Two conventional ultrafiltration membranes (M-1 and M-2) of regenerated cellulose (RC) (a single-layer membrane with a cut-off limit of 100 kDa (M-1) and a multilayer membrane with a cut-off limit of 300 kDa (M-2), produced by a conventional Cocast method (double coating method) without step (b)) and an ultrafiltration membrane according to the invention (M-3) of regenerated cellulose with a damping region and a cut-off limit of 300 kDa, produced by means of the method of the invention, were subjected to the aforementioned testing method for determining the impact resistance or the convective pressure rise. In this case a pressure $P_1$=3 bar and a pressure $P_2$=1 bar were applied, and a cylindrical test element having a diameter of 20 mm which landed repeatedly on the membranes with a force of 85 N. The results obtained are depicted in FIG. 5 and show that with the ultrafiltration membrane (M-3) with damping region, according to the invention, the achievable impact resistance is much higher by comparison with the conventional ultrafiltration membranes (M-1 and M-2).

Example 3: Production of an Ultrafiltration Membrane with Damping Region and Enhanced Impact Resistance in a Chamber A first polymer solution consisting of 50 wt % of acetone, 28 wt % of dioxane, 2 wt % of water, 12 wt % of cellulose acetate (Acetati, type Aceplast PC/FG) and 8 wt % of glycerol is applied via doctor blade and carriage to a PP/PE core-shell nonwoven (OMB-60; Mitsubishi) moving at 70 m/h orthogonally to the outlet opening. Directly bordering the carriage is a chamber 30 cm in length, containing an atmosphere of nitrogen as carrier gas and also 19 g/m$^3$ of a 1:19 ethanol:water mixture and maintained at a constant temperature of 20° C. In the upper region of the chamber, a stream of a preconditioned atmosphere flows through, this stream being controlled in such a way as not to exceed a flow of 0.2 m/s, so that in the lower region of the chamber there are no eddies where the polymer film runs through the chamber. The chamber is operated in such a way that there is always an overpressure of 1 mbar relative to the surrounding space. The ambient environment undergoes suction withdrawal for correct removal of the small amounts of ethanol. On departure from the chamber, the polymer film is moved orthogonally to the outlet opening of a second application medium (carriage with doctor blade), and second polymer solution consisting of 50 wt % of acetone, 28 wt % of dioxane, 2 wt % of water, 12 wt % of cellulose acetate (Acetati, type Aceplast PC/FG) and 8 wt % of glycerol, and is then transferred for phase separation into a water precipitation bath at a temperature of 15° C.

The membrane obtained is then passed through a number of rinsing tanks into a tank with 50% KOH, in which the acetyl groups are hydrolyzed. The membrane is rinsed and excess alkali is neutralized with diluted acetic acid. Relative to comparable single-layer or multilayer membranes, the regenerated cellulose membrane has a particular stability in the z-direction. By crosslinking, in accordance for example with the methods described in DE 102004053787 A1, the membrane can be converted into a crosslinked regenerated cellulose membrane (cellulose hydrate membrane) which likewise has the special mechanical stability.

LIST OF REFERENCE SYMBOLS

1 Support layer
2 First polymer solution
3 Nonsolvent-containing gas (relative to first polymer solution)
4 Second polymer solution
5 Precipitation bath
6 Rinsing tank
11 Wetted membrane on support
21 Outer, retentive skin layer
22 Sponge structure (second polymer layer)
23, 33 Damping region
24 Sponge structure (first polymer layer)
25 Textile support layer
46 Second polymer layer
47 First polymer layer
K Test element
M-1 Conventional ultrafiltration membrane (single-layer membrane, RC, 100 kDa)
M-2 Conventional ultrafiltration membrane (multi-layer membrane, RC, 300 kDa)
M-3 Ultrafiltration membrane of the invention (multi-layer membrane, RC, 300 kDa)
$P_1$ Pressure obtaining above the membrane (11)
$P_2$ Pressure obtaining below the membrane (11)
S Sensor

The invention claimed is:
1. A method for producing an ultrafiltration membrane, comprising:
 (a) applying a first polymer solution to a support layer, to form a first polymer layer which penetrates at least 25% into the support layer, thereby forming a coated support layer;
 (b) contacting the coated support layer from (a) with a gas, which comprises a nonsolvent, relative to the polymer in the first polymer solution, leading to a depth of penetration of the nonsolvent from an atmosphere formed by the nonsolvent-containing gas into the applied first polymer solution of at least 5.0% but less than 80%, based on a total depth of the applied first polymer solution, wherein the gas comprises from 1.0 g/m$^3$ to 20 g/m$^3$ of the nonsolvent;

(c) applying a second polymer solution to the first polymer layer, to form a second polymer layer on the first polymer layer of the coated support layer, thereby forming a multiply coated support layer; and (d) introducing the multiply coated support layer into a precipitating bath, which comprises a precipitant, relative to the polymer in the first and/or second polymer solution, wherein the first and second polymer layers comprise cellulose derivates, wherein the support layer is a nonwoven web, a woven fabric or an open microfilter membrane, and wherein after (d) the first and second polymer layers, taken together, have a complex structure wherein the pores initially widen from a first main surface within the second polymer layer, the pores in the interior of the membrane then taper on entry into the first polymer layer, and the pores in the course of the structure widen again toward a second main surface.

2. The method of claim 1, wherein the first and the second polymer solutions independently of one another have the same or different solids contents of 2 wt % to 40 wt %.

3. The method of claim 2, wherein the first polymer solution has a higher solids content than the second polymer solution.

4. The method of claim 1, wherein the first and the second polymer solutions independently of one another have viscosities of 800 mPa*s to 40000 mPa*s.

5. The method of claim 1, wherein application temperatures in (a) and (c) independently of one another are from 4° C. to 40° C.

6. The method of claim 1, wherein the support layer in (a) and the coated support layer in (c) move at a speed of 30 m/h to 500 m/h relative to the respective first and second polymer solution during application thereof.

7. The method of claim 1, wherein the gas, which comprises a nonsolvent, relative to the polymer in the first polymer solution, comprises nitrogen as a carrier gas and a nonsolvent mixture consisting of 50 vol % to 100 vol % of water and 0 vol % to 50 vol % of ethanol, based on a total amount of the nonsolvent mixture.

8. The method of claim 1, wherein an exposure time in (b) is from 500 ms to 20 s.

9. The method of claim 1, wherein an exposure temperature in (b) is at least 10° C. below the boiling point of the lowest-boiling constituent of the first polymer solution, said boiling point being above 50° C.

10. The method of claim 1, wherein (b) is carried out using a channel in which a flow of nonsolvent-containing gas impinges on the coated support layer at an angle of between 0° and 45°.

11. The method of claim 1, further comprising:
(c1) contacting the multiply coated support layer of (c) with a gas which comprises a nonsolvent, relative to the polymer in the second polymer solution, between (c) and (d).

12. The method of claim 1, further comprising:
(e) introducing the multiply coated support layer into one or more rinsing tanks after (d).

13. The method of claim 1, wherein the first and/or second polymer solution comprises a cellulose ester.

14. The method of claim 13, further comprising (f) hydrolyzing the cellulose ester(s).

15. The method of claim 1, further comprising (g) crosslinking polymer chains in the polymer layers.

16. The method of claim 1, wherein (c) is performed one or more times before (d), using different or identical polymer solutions.

17. The method of claim 1, wherein the gas comprises from 12 $g/m^3$ to 17 $g/m^3$ of the nonsolvent.

18. The method of claim 1, wherein in (b) the coated support layer of (a) is guided through a chamber which possesses a corresponding gas atmosphere, or the contacting is accomplished by the supply of a corresponding gas stream, whereby the volume flow of gas is 10 $m^3/h$ to 600 $m^3/h$ at velocities of 0.3 m/s to 8 m/s (v(gas)).

19. The method of claim 1, wherein the first and second polymer layers independently comprise cellulose derivates selected from the group consisting of cellulose ester, cellulose nitrate, regenerated cellulose, and crosslinked regenerated cellulose.

20. The method of claim 1, wherein the support layer is made of polyolefin, polyester, polyamide, polyethersulfone, or regenerated cellulose.

* * * * *